(12) United States Patent
Kameda

(10) Patent No.: US 7,467,235 B2
(45) Date of Patent: Dec. 16, 2008

(54) DATA TRANSFER METHOD AND SYSTEM

(75) Inventor: Masami Kameda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 695 days.

(21) Appl. No.: 10/784,111

(22) Filed: Feb. 20, 2004

(65) Prior Publication Data

US 2005/0144254 A1   Jun. 30, 2005

(30) Foreign Application Priority Data

Dec. 24, 2003   (JP)   ............... 2003-426168

(51) Int. Cl.
G06F 15/16   (2006.01)
(52) U.S. Cl. .................. 709/250; 709/212
(58) Field of Classification Search .......... 709/237, 709/250
See application file for complete search history.

(56) References Cited

U.S. PATENT DOCUMENTS

| 5,119,488 A * | 6/1992 | Takamatsu et al. ........... 714/4 |
| 5,948,062 A * | 9/1999 | Tzelnic et al. ............... 709/219 |
| 6,892,203 B2 | 5/2005 | Kasako et al. |
| 7,134,040 B2 * | 11/2006 | Ayres .............................. 714/4 |
| 2002/0083120 A1 * | 6/2002 | Soltis ........................... 709/200 |
| 2003/0061456 A1 | 3/2003 | Ofek et al. |
| 2003/0097607 A1 * | 5/2003 | Bessire ......................... 714/5 |
| 2003/0105936 A1 | 6/2003 | Stakutis et al. |
| 2003/0237019 A1 * | 12/2003 | Kleiman et al. ............. 714/6 |
| 2004/0010669 A1 | 1/2004 | Nishimura et al. |
| 2004/0098637 A1 * | 5/2004 | Duncan et al. ............... 714/6 |

FOREIGN PATENT DOCUMENTS

| JP | 2001-197112 | 7/2001 |
| JP | 2002-007304 | 1/2002 |
| JP | 2003-032290 | 1/2003 |

* cited by examiner

Primary Examiner—Andrew Caldwell
Assistant Examiner—Christopher Biagini
(74) Attorney, Agent, or Firm—Townsend and Townsend and Crew LLP

(57) ABSTRACT

A computer system that transfers data from a first storage unit to a second storage unit via a network. The computer system includes a first controller that transfers data, stored in the first storage unit, to the second storage unit using a block transfer protocol; a table that associates a file composed of a plurality of blocks of data with blocks of data constituting the file; and a second controller that, in response to information that identifies a block from the first controller, identifies a file corresponding to the block using the table and transfers the identified file to the second storage unit using a file transfer protocol.

13 Claims, 8 Drawing Sheets

FIG. 4A
BLOCK TRANSFER
FIG. 4B
FILE TRANSFER
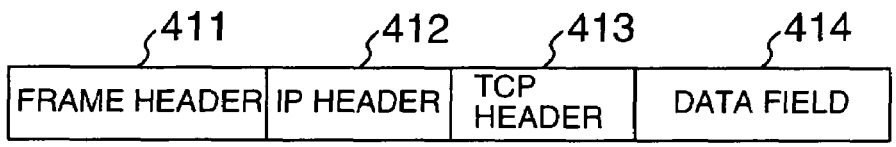
FIG. 5
| FILE NAME | BLOCK NUMBER | SEQUENCE | TRANSFER SUCCESS/ FAILURE FLAG |
|---|---|---|---|
| /tmp/work.dat | 001 | 1 | Success |
| /tmp/work.dat | 002 | 2 | Success |
| /tmp/work.dat | 003 | 3 | Success |
| /tmp/library.dat | 004 | 1 | Success |
| /tmp/library.dat | 005 | 3 | Success |
| /tmp/library.dat | 006 | 2 | Failure |
| /tmp/sample.txt | 007 | 1 | Undone |
FILE / BLOCK MANAGEMENT TABLE

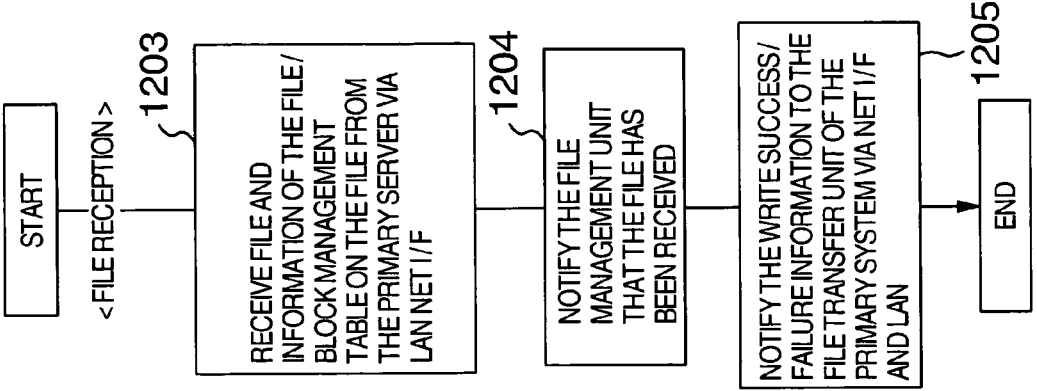
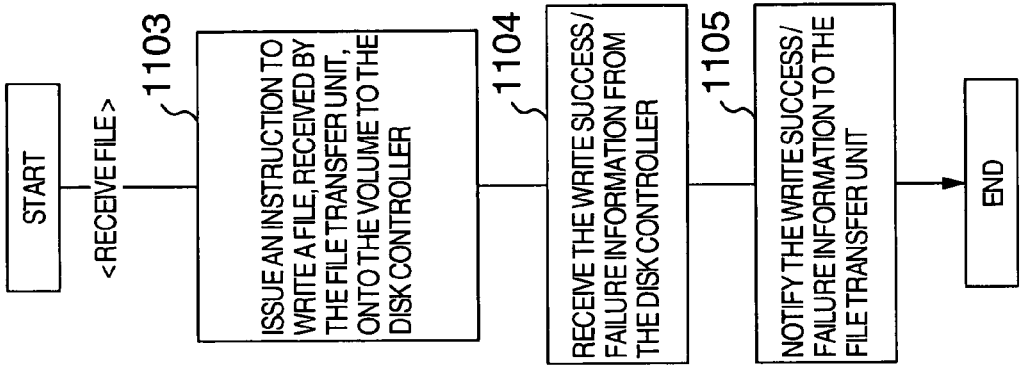
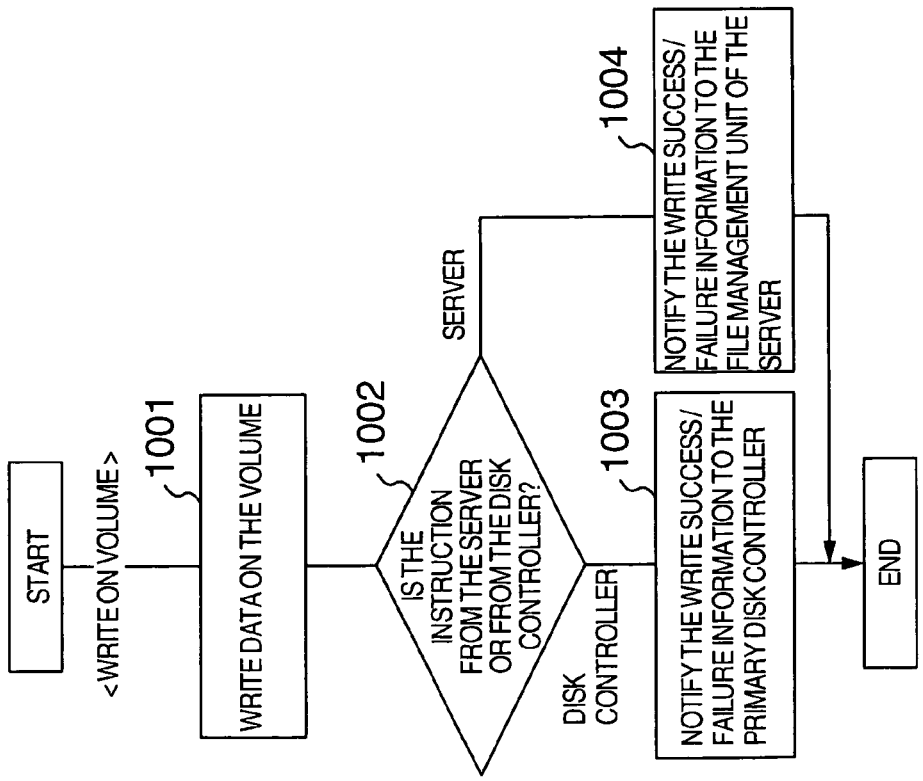

DATA TRANSFER METHOD AND SYSTEM

BACKGROUND OF THE INVENTION

The present invention relates to a technology for transferring data stored in a computer system such as the one used as a storage system, and more particularly to a technology for transferring data, stored in a storage system, to a backup system using NAS (Network Attached Storage) and other file system functions.

Today, as the environment of a network such as the Internet evolves and as digital information becomes more diversified (document, drawing, image, visual content, etc.), an information processing system must processes more and more data. The functions of an information processing system that processes a large amount of data are classified roughly into two: the server function and the storage function.

The server function executes applications in a system, which has the server function, to execute application processing provided by the information processing system. The storage function stores data used by a system that has the server function. A system that has the storage function, such as a storage system, has volumes for each system that has the server function such as a file server, with the volumes formatted by a file system recognizable by the file server. The file server and the storage system can be connected by a network called SAN (Storage Area Network). SAN uses a transmission line, usually called a fibre channel, to implement a data transfer method that is faster and more reliable than a general network. Because a plurality of servers and storage systems can be connected via SAN, data can be copied between storage systems without affecting application processing executed by the servers.

Transferring or copying data from a storage system to another storage system or another volume to protect data from an accident, a disaster, or a failure is called "backup". A server or a storage system to be used for backup may be located at a remote place to which data is transferred or copied via WAN (Wide Area Network).

A server that performs application processing described above and a storage system that stores data used for the application processing are called a primary server and a primary storage system, respectively, while a server and a storage system for backup are called a backup server and a backup storage system, respectively. The backup server and the backup storage system are connected via SAN as with the primary server and the primary storage system.

The servers are connected also to a LAN (Local Area Network), a network separate from the SAN described above. Data is transferred over a LAN using a communication protocol called an IP (Internet Protocol).

In one prior art method, data is transferred from a primary storage system to a backup storage system at backup time via SAN and WAN, one disk block at a time (for example, see JP-A-2002-7304). In the event of a failure on a route via SAN and WAN during data transfer, the data transfer is stopped.

It is also possible that data is transferred from a primary system to a backup system via LAN and WAN using IP. In a general IP-based data transfer using multiple candidates for the transfer route, the network is switched from one network to another if a network failure is detected. Another prior art method transfers data using IP (for example, see JP-A-2001-197112).

A still another prior art method is that the transfer route is selected from multiple networks with different communication protocols (For example, see JP-A-2003-32290).

In the prior art method in which data is backed up via SAN (for example, JP-A-2002-7304), when a failure occurs on a route and data cannot be transferred during the transfer of data from the primary storage system to the backup system via SAN and WAN, the system either waits for the failure on the route to be recovered to restart the data transfer or completes the backup using another route on the SAN and the WAN. In the prior art method in which data is transferred using IP (for example, JP-A-2001-197112), the network route is changed quickly in the IP-based network to avoid a failure. In the prior art method in which data is transferred using the SAN and IP (for example, JP-A-2003-32290), the network can be specified according to the network usage environment.

However, those prior art methods do not assume a data transfer over networks with different transfer protocols or, though it looks as if a data transfer over networks with different transfer protocols is assumed, those prior art methods do not give full consideration to the transfer unit of data that is transferred. Actually, it is necessary to consider the data transfer unit when transferring data between storage systems and, when transferring data between storage systems via SAN using fibre channels, data is transferred on a block basis based on SCSI (Small Computer System Interface). However, when a server transfers data via LAN using IP, the server transfers data in units of files of the file system recognized by the server. Therefore, if a data transfer (in units of blocks) fails on a SAN and WAN route between storage systems, the data cannot be transferred directly between the servers via LAN and WAN. This problem cannot be solved simply by changing the transfer protocol from SCSI to TCP/IP (Transmission Control Protocol/Internet Protocol) but requires consideration for what data transfer unit is to be used. In particular, this problem is important from the aspect of system management when a failure occurs during data transfer on a block basis.

SUMMARY OF THE INVENTION

One of the concepts of the present invention is that block-basis data transfer and file-basis data transfer can be switched, as necessary, for transferring data from one storage unit (for example, storage, disk, volume, storage area) to another. Another concept is that two types of transfer technology can be used as necessary: a transfer technology used in a system that manages data, stored in a storage unit, at a block level and a transfer technology used in a system that manages data at a file level. This makes it possible to realize a more flexible data transfer with no limitation of a single-protocol data transfer. In addition, the user can select from a wider range of networks according to various data transfer conditions and status (user needs, network usage status, etc.).

More specifically, the present invention provides a computer system that transfers data from a first storage unit to a second storage unit via a network (for example, SAN, LAN, WAN). The computer system comprises a first controller that transfers data, stored in the first storage unit, to the second storage unit on a block basis using a block transfer protocol; a table (for example, file/block management table) that associates a file composed of a plurality of blocks of data with blocks of data constituting the file; and a second controller that, in response to information that identifies a block (for example, logical block address) from the first controller, identifies a file corresponding to the block using the table and transfers the identified file to the second storage unit on a file basis using a file transfer protocol. The first controller and the second controller may reside in a storage system and a server with the file management function, respectively, as in a SAN configuration or may reside in the same system/cabinet as in a NAS (Network Attached Storage) configuration. Data may be transferred via a plurality of networks to flexibly perform processing for a network failure or to utilize the network characteristics (both a relatively high speed, high reliability, high cost network and a relatively low speed, low reliability, low cost network are used); for example, data under the block transfer protocol is transferred in a SAN where resources are connected via fibre channels and data under the file transfer protocol is transferred in a LAN.

When the transfer of data from the first storage unit using the block transfer protocol fails, for example, when a failure is detected at the time data is read from the first storage unit or a transfer processing failure including a network failure is detected (is judged as a failure) or when a data reception rejection is received from the system managing the second storage unit, the first controller may notify the information, which identifies the transfer-failed block, to the second controller. This allow data transfer processing to be switched at a predetermined time such as a user specified time and, in particular, assures data transfer processing when the data transfer processing fails.

Because an identified file includes data other than the transfer-failed block (data already transferred by the first controller using the block transfer protocol or data not yet transferred), block-basis transfer can be switched reliably to file-basis transfer.

When the file-basis transfer fails, for example, when a failure is detected at the time the data of the file is read or a transfer processing failure including a network failure is detected (is judged as a failure) or when a data reception rejection is received from the system managing the second storage unit, the second controller may identify a plurality of blocks of the transfer-failed file and instruct the first controller to transfer the data of the plurality of blocks. This allows file-basis transfer processing to be switched to block-basis transfer processing.

The first storage unit comprises at least a main volume and a sub volume. When the block-basis transfer of data from the sub volume fails, the first controller notifies information, which identities the transfer-failed data block, to the second controller and, in response to an instruction to transfer a plurality of blocks of data related to the transfer-failed file from the second controller, transfers data stored on the main volume and corresponding to the plurality of blocks on a block basis. This makes it possible to use a data processing method that minimizes the effect on the processing that is executed usually using the main volume.

The data transfer method described above is applicable also to a data transfer during backup processing. The present invention is applicable also to a program that executes the functions described above or to a recording medium storing therein the program.

Other objects, features and advantages of the invention will become apparent from the following description of the embodiments of the invention taken in conjunction with the accompanying drawings.

BRIEF DESCRIPTION OF THE DRAWINGS

FIG. 4A is a diagram showing an example of a data structure when data is transferred on a block basis, and FIG. 4B is a diagram showing an example of a data structure when data is transferred on a file basis.

FIG. 5 is a diagram showing an example of a file/block management table.

FIG. 10 is a diagram showing another example of the flowchart of steps executed by the backup system disk controller.

FIG. 11 is a diagram showing an example of the flowchart of steps executed by a backup system file management unit.

FIG. 12 is a diagram showing an example of the flowchart of steps executed by a backup system file transfer unit.

DETAILED DESCRIPTION OF THE EMBODIMENTS

Figure 1:
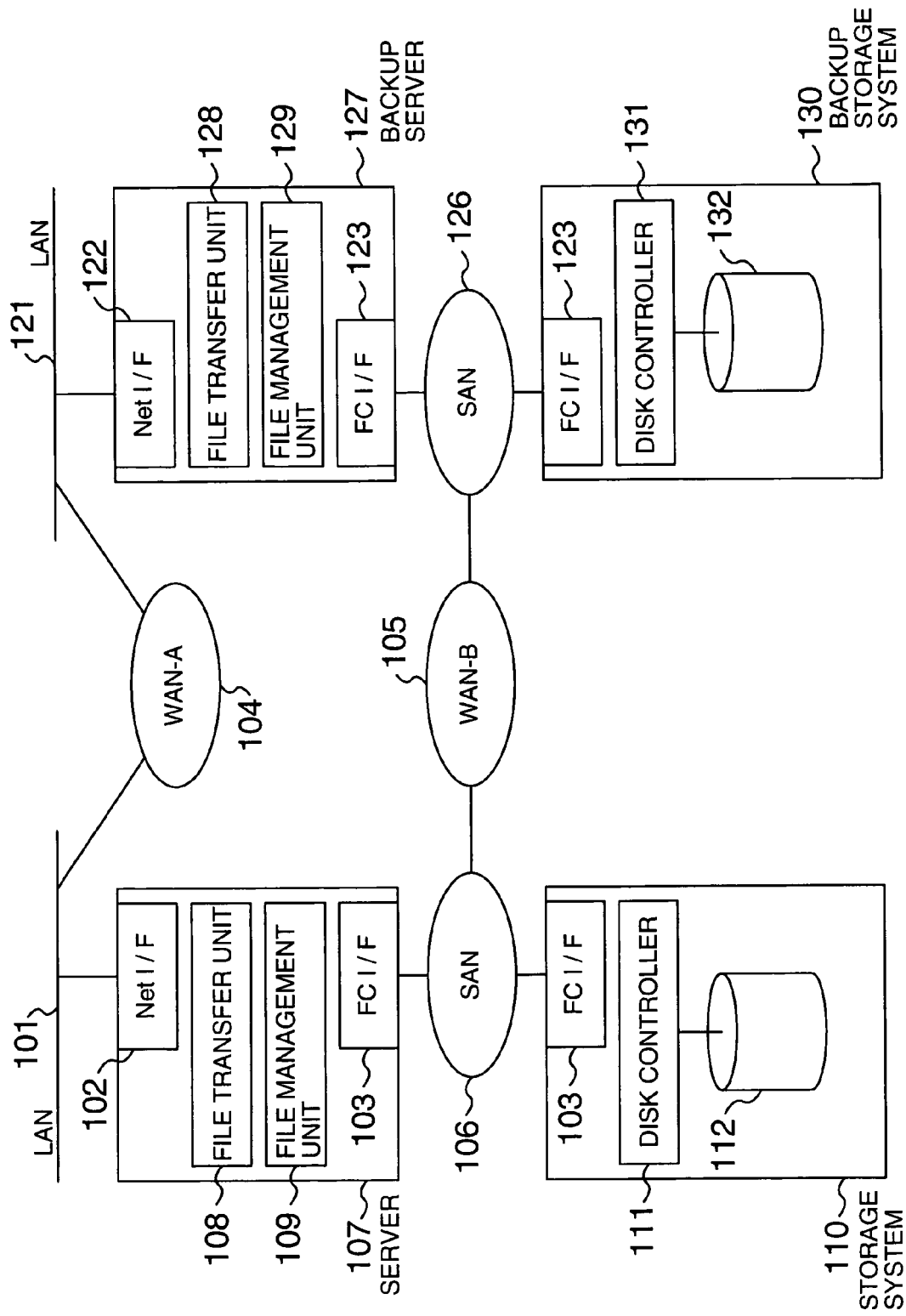
FIG. 1 is an overall configuration diagram showing an embodiment of a network environment to which the present invention is applied.

An embodiment of the present invention will be described in detail with reference to the drawings. FIG. 1 is an overall configuration diagram showing one embodiment of a network environment to which the present invention is applied.

In this embodiment, a data transfer method according to the present invention is applied to a system where data backup processing is performed. A primary storage system 110 and a primary server 107 are connected to a SAN 106 via a fibre channel interface (FC I/F) 103. The server 107 comprises a controller such as a microchip that controls the whole system and performs program processing and a storage unit in which programs and data are stored. The storage unit, composed of a main storage unit such as a memory, an auxiliary storage unit such as a hard disk, and a database, stores an OS (Operating System), a file transfer program, a file management program, application programs, as well as data and programs necessary for processing executed on the server 107. The programs stored in the storage unit and the controller work together to execute the functions described below.

The server 107 provides a file transfer unit 108 and a file management unit 109 as a function of the controller. The file transfer unit 108 transfers files under control of the file transfer program and the OS running in the controller. The file management unit 109 associates file names with data of the files using a file/block management table that will be described later (this table may be stored in or out of the server 107) under control of the file management program and the OS running in the controller.

Usually, the OS such as UNIX (registered trademark) and application programs are executed in the server. Data (file) used by an application program is notified to the storage system 110, with its address identified using the file/block management table, and is stored on a volume 112 via a disk controller 111 that is the controller of the storage system 110. There may be one or more volumes 112. For example, the same data is stored on multiple volumes (main volume and sub volume) to allow data on the main volume to be used for application programs, and data on the sub volume for backup or restore processing. Those volumes are formatted in the file system format used by the OS in the server 107.

The server 107 is connected to a LAN 101, a network separate from the SAN 106, via a network interface (Network I/F) 102. The LAN 101 and the SAN 106 are connected to WAN-A 104 and WAN-B 105, respectively. Although WAN-A and WAN-B are separate networks in this example, the present invention is applicable to an example in which the same WAN is used or to an example in which the primary system and the backup system are connected to the same SAN with no WAN between them. A backup system storage system 130 and a backup system server 127 are connected to WAN-A 104 and WAN-B 105 via a LAN 121 and a SAN 126, respectively. As in the primary system, the storage system 130 and the server 127 of the backup system are connected to the SAN 126 via a fibre channel interface (FC I/F) 123.

Although the controller of the server and the controller of the storage system are separate, independent systems in this embodiment, the controller of the server and the controller of the storage system may be in the same system as in a NAS and only a storage unit such as the volume 112 may be separate, independent unit.

Although the above example system, where data backup processing is performed, is composed of the primary system and the backup system, the present invention may be widely applicable to a data transfer between systems, for example, a data transfer between two primary systems.

Figure 2:
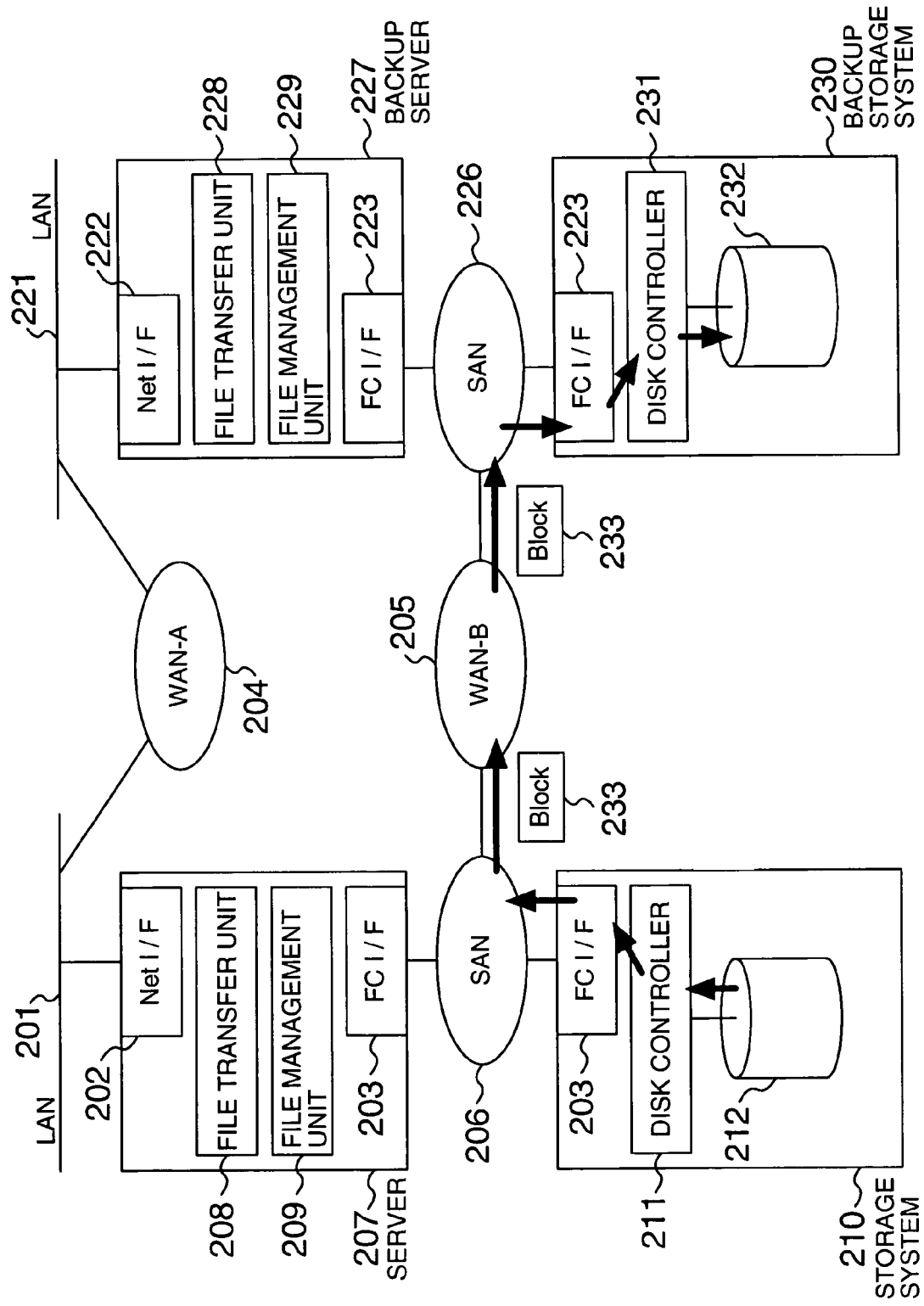
FIG. 2 is a diagram showing an example of data flow when data of a primary storage system is backed up.

FIG. 2 shows a data flow when data in the storage system of the primary system is backed up. A disk controller 211 of a storage system 210 reads data from a volume 212 and sends it to a SAN 206 via a fibre channel interface 203. The data is sent via WAN-B 205 to a SAN 226 to which the backup system is connected, and a disk controller 231 receives the data via a fiber channel interface 223 and stores it in a volume 232. In this case, data is transferred on a block basis, one block 233 at a time. After successfully storing the transferred data in the volume 232, the disk controller 231 of the backup system sends a response to the primary system disk controller 211 indicating that the data has been successfully stored. Upon receiving this response, the disk controller 211 of the primary system judges that the data has been successfully backed up. If this response is not received within a predetermined time after data is sent, the disk controller 211 judges that the data transfer has failed because a failure occurred in a path of the SAN 206, SAN 226, and WAN-B. The disk controller 211 sends success/failure information indicating whether or not the data has been transferred successfully, as well as the block number that is information related to the data, to a file management unit 209 in a server 207 via the SAN 206. The file management unit 209 manages this success/failure information in a file/block management table (which will be described later).

It is also possible that, only when the data transfer failed, the disk controller 211 sends the information (a block number, etc.), which identifies the transfer-failed data, to the file management unit 209 of the server 207.

In addition to the transfer route failure described above, a failure that may occur when the disk controller 211 reads data from the volume 212 and a data reception rejection that may be received from the disk controller 231 may be treated as a data transfer processing failure. The data read failure and the data reception rejection may also be managed separately from the transfer path failure described above.

Figure 3:
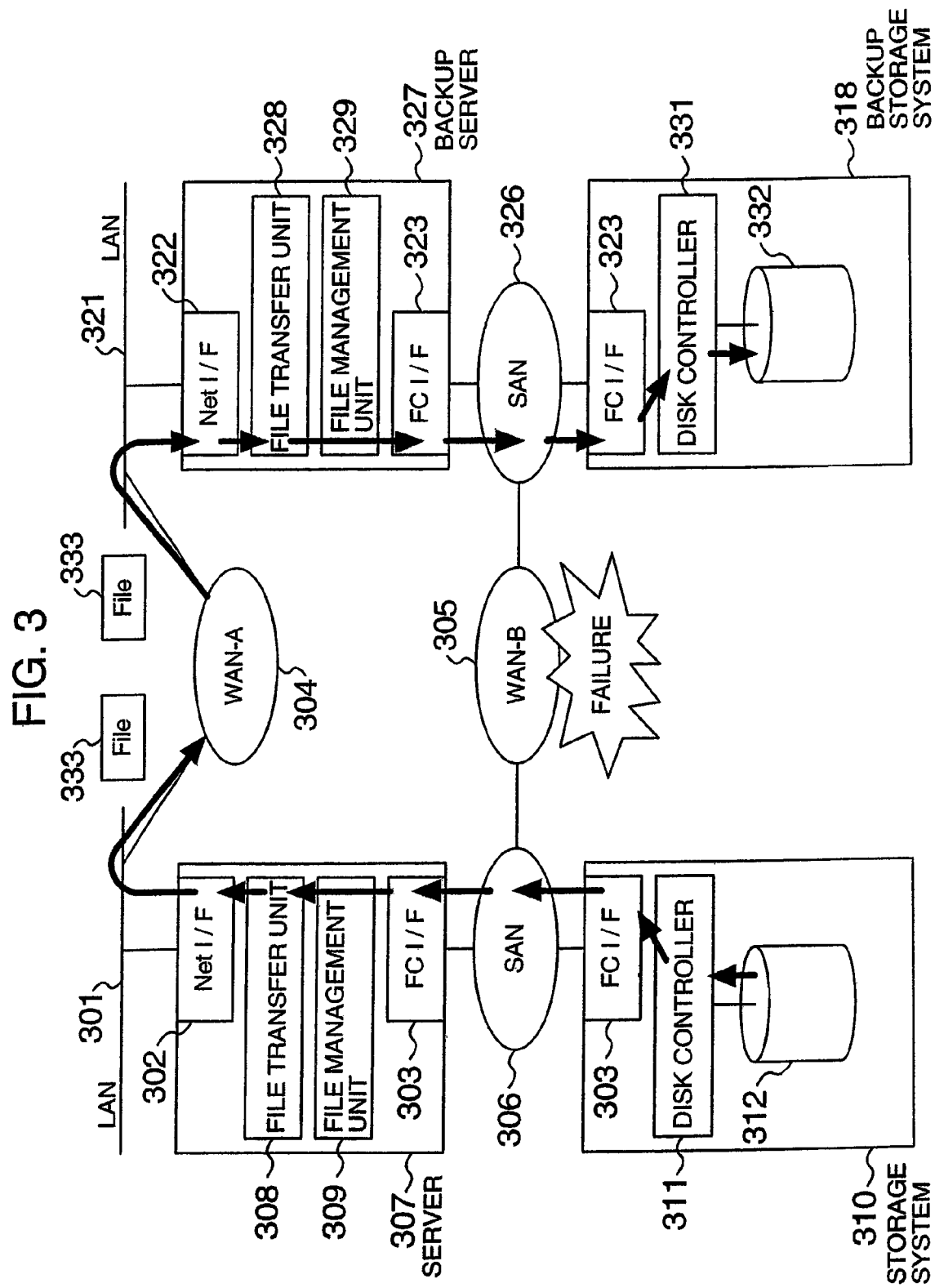
FIG. 3 is a diagram showing an example of data flow when data is backed up while circumventing a data transfer processing failure.

FIG. 3 shows the flow of data transfer for circumventing a failure and completing data transfer and backup when a transfer-failed data block is generated due to a failure that occurs during the data transfer via WAN-B shown in FIG. 2. A file transfer unit 308 of a server 307 performs this data transfer. A file management unit 309 searches a file/block management table (which will be described later) for a file including a block, whose transfer success/failure flag indicates a failure, and notifies the corresponding file name to the file transfer unit 308 so that the file transfer unit 308 can find a file not yet transferred. The file is read from a volume 312 via a disk controller 311 of a storage system 310 and is sent to a network LAN 301 via a SAN 306 and network interfaces 302 and 303. In this case, data is transferred on a file basis, one file 333 at a time. A file transfer unit 328 of a backup system server 327 receives the transferred data via WAN-A and a LAN 321, and a file management unit 329 stores the data in a volume 332 of a backup storage system 318 via a fibre channel interface (FC I/F) 323, a SAN 326, and a disk controller 331. This completes data transfer and backup when data transfer via WAN-B failed. The file management unit 309 starts searching the file/block management table 401 in timing e.g. when a data transfer failure notification is received from the disk controller 311 of the storage system 310, when a predetermined interval passes, or when a user instruction is received.

FIG. 4A shows an example of the data structure when data is transferred on a block basis, and FIG. 4B shows an example of the data structure when data is transferred on a file basis.

FIG. 4A shows an example of a frame, the basic unit used to transfer data on a block basis, via networks such as a SAN. A frame 400 is composed of a Start Of Frame (SOF) 401 and an End Of Frame 405 that indicate a boundary between frames, a frame header 402 that includes the address identifier of the frame receiving side or the address identifier of the frame sending side, a data field 403 that is a data part containing data to be actually transferred, and a CRC (Cyclic Redundancy check) field 404. The data field 403, variable in length from 0-2112 bytes, is used to transfer data of a block. FIG. 4B shows an example of a frame used to transfer data on a file basis via a LAN. A frame 410 is composed of a frame header 411, an IP header 412 that includes an IP address identifying the source address or the destination address, a TCP header 413 that includes data transfer reliability information, such as a sequence number indicating a byte position in a stream of the sending application that sends data or a confirmatory response number indicating to which data the receiving side has received data in bytes, and a data field 414 that is a data part containing data to be actually transferred. Using this frame, the data of a file is transferred. Using TCP/IP for identifying a sending or receiving user or application, and FTP (File Transfer Protocol) for transferring a file using the file transfer start flag and the file transfer end flag as starting and ending marks, all data of a file is transferred at a time or the data of a file is divided into fixed-length data units which are sequentially transferred. When a file is divided before being transferred, sequence numbers are used so that the receiving side can reconfigure the transferred data as the data of a file.

FIG. 5 shows the file/block management table. A file/block management table 501 associates each file identifier, such as a file name 502, with information identifying a block address such as the block number 503 of a block on a volume on which the contents of the file are stored. A block number, assigned to each block, includes information on a position on the volume. When the physical block addresses of a physical volume are associated with the logical block addresses of a logical volume in the storage systems 110 and 130 (for example, the disk controllers 111 and 131 manage the correspondence between physical block addresses and logical block addresses), logical block addresses may be used as block numbers. A sequence 504 is the sequence of a block in which the contents of the file are written. A transfer success/failure flag 505 is associated with each block number 503. The table in FIG. 5 indicates that the contents of the file "/tmp/work.dat" are stored in blocks 001-003 in order of 001, 002, and 003 and that transfer was successful (Success) for all blocks. By contrast, the table indicates that the transfer of block 006 failed (Failure). That is, the table indicates that part of the contents of the file "/tmp/library.dat" is not yet transferred. The table also indicates that the transfer of the file "/tmp/sample.txt" is not yet done (Undone). The file management unit 209 updates the transfer success/failure flag 505 in the file/block management table 501 according to the transfer success/failure information sent from the disk controller 211.

When information identifying transfer-failed data (for example, block number) is sent to the file management unit of the server only when a data transfer fails, the table may be maintained in such a way that the flag is set only when the transfer processing fails. On the other hand, if it is desired that not only the transfer route failure described above but also a failure that may occur when the primary system disk controller reads data from the volume and a data reception rejection that may be received from the backup system disk controller be included in the data transfer processing failure, those failures may also be treated as a transfer processing failure. To distinguish a data read failure and a data reception rejection from the transfer route failure described above, information may be added to the file/block management table to identify the contents of the failure.

Figure 6:
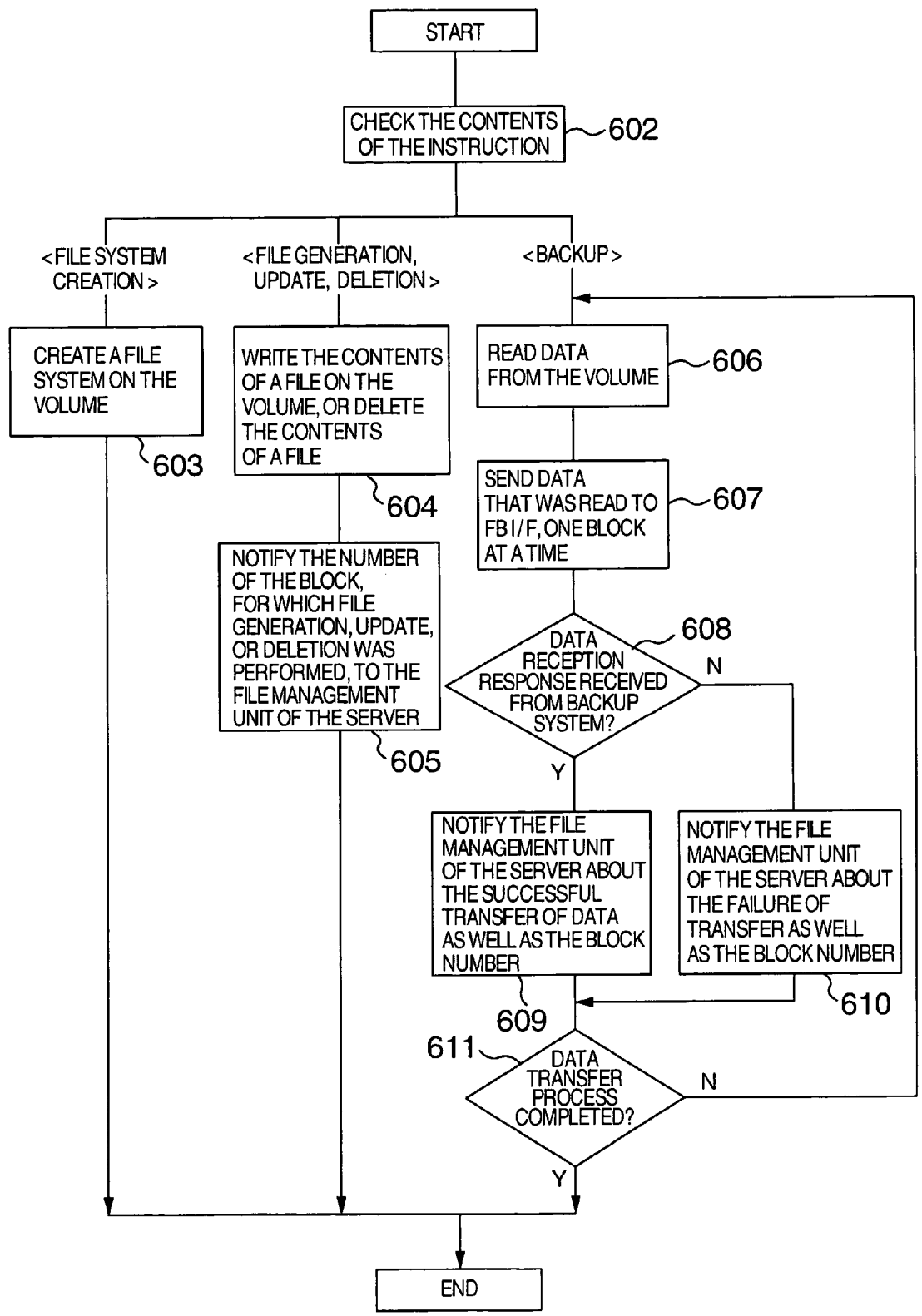
FIG. 6 is a diagram showing an example of the flowchart of steps executed by a primary system disk controller.

FIG. 6 is a flowchart showing processing executed by the disk controller of the primary storage system. In response to an instruction from the server, the disk controller checks the contents of the instruction (step 602). When the instruction is a file system creation instruction, a file system is created on the volume in step 603 (a new area is allocated, the file system is initialized, and so on). At this time, the file/block management table is generated in the server (see step 704 in FIG. 7). When the instruction is a file generation, update, or delete instruction, data is written on, or deleted from, the volume according to the instruction in step 604 on a block basis. In step 605, the number of the block on the volume in which file generation, update, or deletion was performed is notified to the file management unit of the server. This allows the result of file operation during a usual operation to be reflected in the file/block management table in the server (see step 706 in FIG. 7).

When the instruction is a backup instruction, data is read from the volume on a block basis (step 606). In step 607, data that is read is sent to the fibre channel interface (FC I/F) on a block basis. In step 608, the disk controller waits for the backup storage system to return a data reception response. When the reception response is received, the disk controller judges that the data has been transferred successfully and, in step 609, notifies the file management unit of the server about the successful transfer of the data as well as the block number of the data. If no notification is received within a predetermined time, the disk controller notifies the file management unit of the server about the failure of the transfer, as well as the block number, in step 610. This allows the result of backup to be reflected in the file/block management table in the server (see step 708 in FIG. 7). In step 611, the disk controller checks if the volume still contains data to be transferred or backed up. If the volume still contains such data, control is passed back to step 606 to read the next data from the volume. If the volume does not contain such data, the transfer and backup processing is terminated.

If it is desired that the disk controller notify the file management unit of the server about information identifying transfer-failed data (for example, block number) only when a data transfer fails, the processing of step 609 may be omitted. In this case, the block number is notified in step 610 to allow the server to judge that the transfer processing has failed. If it is desired that a failure that may occur when the disk controller reads data from the volume be treated as a data transfer processing failure, a failure that may occur during the processing of step 606 should be notified to the file management unit of the server. If it is desired that a data reception rejection sent from the backup storage system be treated as a data transfer processing failure, the rejection response received during the processing of step 607 should be notified to the file management unit of the server. To distinguish a data read failure and a data reception rejection from the transfer route failure described above, the notification should include information identifying the cause of the failure.

Figure 7:
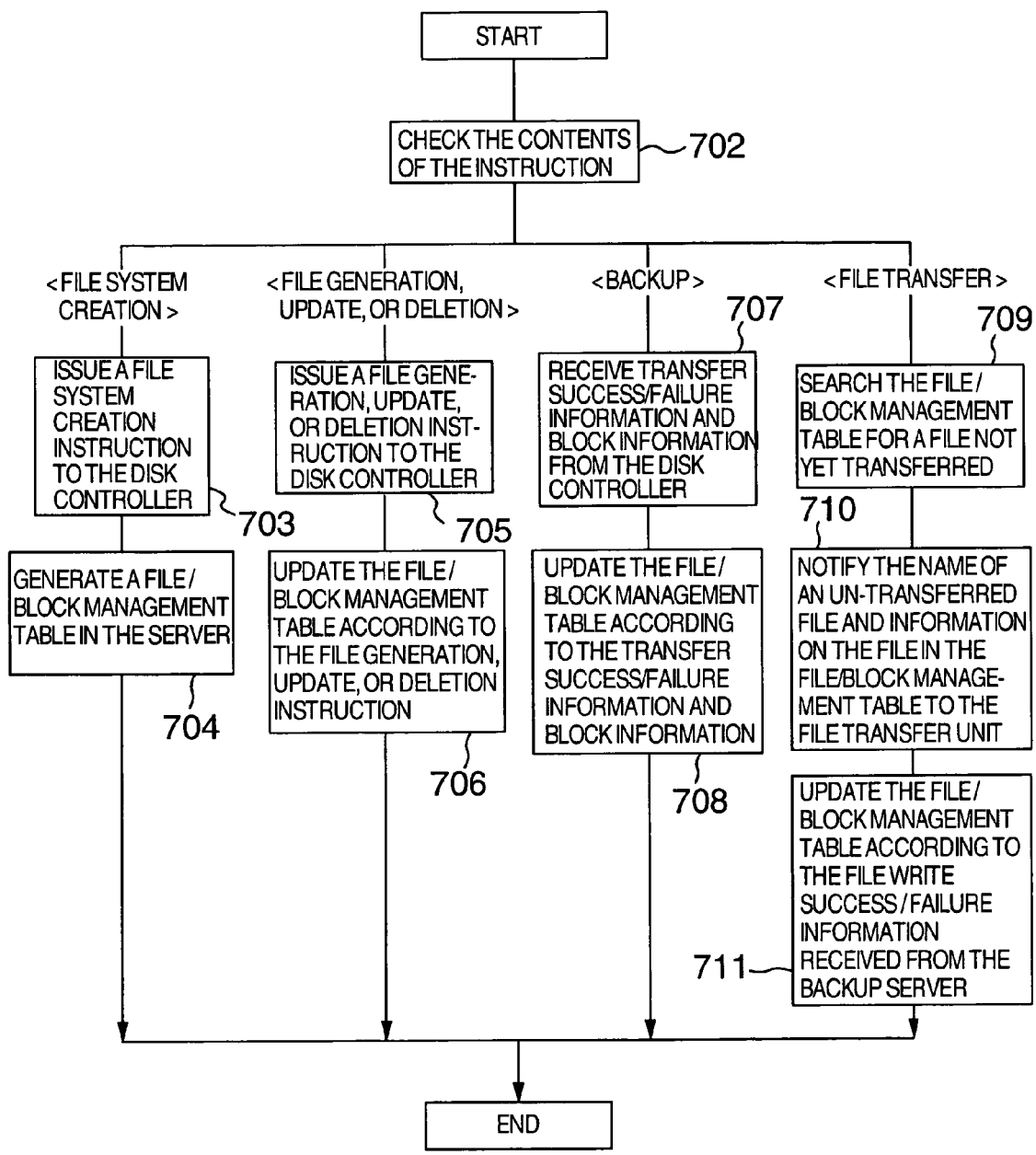
FIG. 7 is a diagram showing an example of the flowchart of steps executed by a primary system file management unit.

FIG. 7 is a flowchart showing processing executed by the file management unit of the primary system. In response to an instruction from a client device connected to the server or an application program running in the server, the file management unit checks the contents of the instruction (step 702). When the instruction is a file system creation instruction, the file management unit issues a file system creation instruction to the disk controller of the storage system (step 703) and generates a file/block management table (step 704). When the instruction is a file generation, update, or deletion instruction, the file management unit issues to the disk controller a data manipulation instruction according to the instruction (step 705) and updates the file/block management table according to the file generation, update, or deletion instruction (step 706).

When the instruction is a backup instruction, the file management unit issues a backup instruction to the disk controller and receives transfer success/failure information and the block information from the disk controller (step 707). In step 708, the file management unit updates the file/block management table according to the transfer success/failure information and the block information. When a server-less backup method is used or a backup server is built separately, it is also possible that the backup instruction is not issued directly to the disk controller but that the file/block management table is updated upon receiving the transfer success/failure information and the block information from the disk controller.

When the instruction is a file transfer instruction, the file management unit searches the file/block management table in step 709 for a file related to a transfer-failed block. The file related to a transfer-failed block refers to a file whose contents are stored, in part or in whole, in that block. In the example in FIG. 5, the transfer of block 006 failed and therefore the corresponding file "/tmp/library.dat" is found. If it is desired that a transfer route failure be distinguished from a data read failure or a data reception rejection, the file/block management table should have an additional field containing the information identifying the cause of failure. This makes it possible to manage the transfer operation flexibly according to the contents of a data transfer failure. For example, a file transfer policy is pre-established and managed by the file management unit, or the transfer policy is added when the file transfer instruction is executed. An example of the transfer policy is that only files associated with block transfer failure data due to a transfer route failure are transferred or that only files associated with block transfer failure data due to a data reception rejection are not transferred.

In step 710, the file name that is found and the information (block number, sequence) on that file stored in the file/block management table are notified to the file transfer unit. In step 711, the file/block management table is updated according to the file write success/failure information received from the backup server. For example, if information indicating that data has been written successfully in "/tmp/library.dat" is received, the transfer success/failure flag of block 006 in the file/block management table shown in FIG. 5 is changed to "Success".

If file transfer processing is started, not by an instruction from a client device or an application program in the server, but by a notification from the disk controller of the storage system indicating that data transfer has failed, it is possible that, upon receiving the notification, the file management unit identifies the file (finds an un-transferred file) corresponding to the transfer-failed block based on the information notified from the disk controller in step 709 and passes control to step 710.

When file transfer processing fails, for example, when information indicating a file write failure is received in step 711, it is possible to identify a block corresponding to the transfer-failed file using the file/block management table and to instruct the disk controller of the storage system to transfer the data of that block. This allows the data transfer method to be selected according to the network status. In addition, if a file transfer processing failure occurs during file transfer processing started by a notification from the disk controller indicating that data transfer processing has failed, it is also possible for the file management unit to work with the disk controller to perform data transfer processing using a volume different from that used when the disk controller issued a notification, which indicate that data transfer processing failed, to the file management unit. For example, assume that the block number transferred between the disk controller and the file management unit is a logical block address and that the disk controller manages the physical block addresses of the main volume and the sub-volume corresponding to the logical block address. In this case, the first data transfer processing is performed on a block basis using the sub-volume and, if the data transfer processing fails, data transfer processing is performed on a file basis and, if the data transfer processing fails again, the data transfer processing is performed in unit of blocks using the main volume. This method makes it possible to build a configuration that minimizes effects on an application processing in which the main volume is used while allowing the data transfer method to be selected according to the network status.

Figure 8:
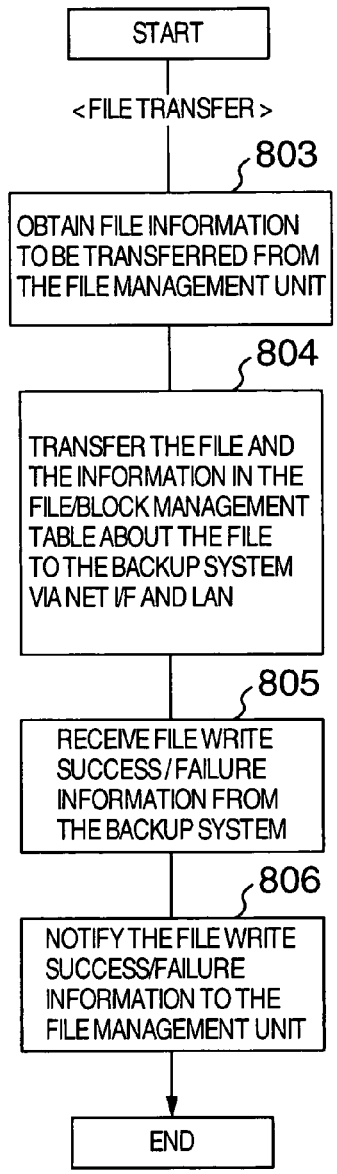
FIG. 8 is a diagram showing an example of the flowchart of steps executed by a primary system file transfer unit.

FIG. 8 is a flowchart showing processing executed by the file transfer unit of the primary system. In step 803 of the file transfer processing executed by the file transfer unit, the file transfer unit obtains the file information to be transferred from the file management unit. This file information is the information obtained in steps 709 and 710 in FIG. 7. Based on the file information (un-transferred file name, information included in the file/block management table, etc.), the file transfer unit specifies the block numbers of the file to be transferred, issues an inquiry to obtain data corresponding to the block numbers from the disk controller of the storage system, and builds the data of the file. For example, the file name is attached to the data of the file.

The file information notified from the file management unit to the file transfer unit may include data that constitutes the file. In that case, the file management unit sends an inquiry to the disk controller of the storage system with the block numbers specified to obtain the data of the file to be transferred.

In step 804, the file transfer unit transfers the file to be transferred and the information (block number, sequence) in the file/block management table about the file to the server of the backup system via the network interface (Net I/F) and the LAN. Using the file information to be transferred that is received from the file management unit, the file transfer unit builds the data of the file, related to the transfer-failed block during the block-basis data transfer, and transfers the data as a file. This means that the data of the file is transferred, beginning with the start of data of the file, including the data already transferred successfully during the block-basis data transfer. This file-basis data transfer processing overwrites the data already transferred successfully to the volume in the backup system during the block-basis data transfer processing.

In step 805, the file transfer unit receives file write success/failure information from the server of the backup system. This corresponds to step 1205 in FIG. 12. In step 806, the file write success/failure information is notified to the file management unit. This allows the file management unit to update the file/block management table in step 711 in FIG. 7 according to the success/failure information of the file transfer.

Figure 9:
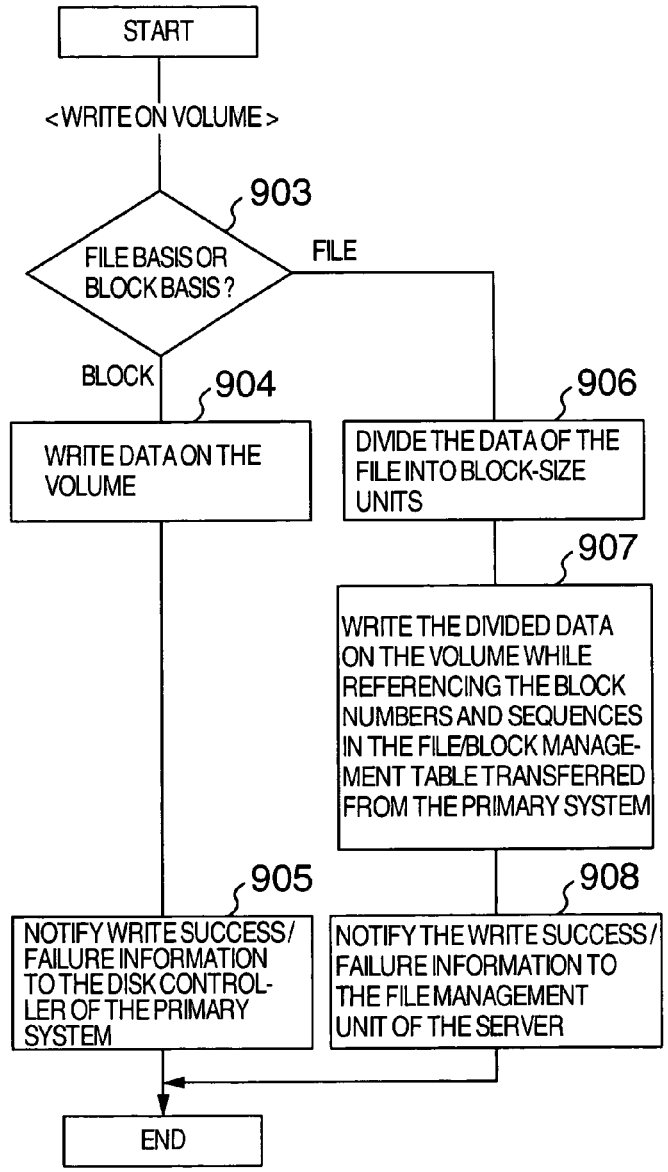
FIG. 9 is a diagram showing an example of the flowchart of steps executed by a backup system disk controller.

FIG. 9 is a flowchart showing processing executed by the disk controller of the backup system. In the volume write processing executed by the disk controller, the disk controller checks in step 903 if data is to be written on a file basis or on a block basis. That is, the disk controller checks whether data is transferred on a block basis between the storage systems for writing or the file is transferred via the servers for writing. When data is written on a block basis, the disk controller writes data on the volume in step 904 and notifies the write success/failure information to the disk controller of the primary storage system in step 905. When data is written on a file basis, the disk controller divides the data of the file into blocks in step 906. For example, if block delimiting information is included in the data of the file, the disk controller uses this block delimiting information to divide the data or divides the data of the file into block-size units beginning with the start of data of the file. In step 907, the disk controller writes the divided data on the volume while referencing the block numbers and sequences in the file/block management table transferred from the primary system. The processing in step 906 and step 907 will be described in detail using an example. Assume that the transferred file is "/tmp/library.dat" shown in FIG. 5. In the primary system, this file is composed of three blocks, 004, 006, and 005, which are stored in this order. When this file is divided in step 906, the file is divided into three data units. In step 907, the disk controller writes those three data units at blocks 004, 005, and 006 on the volume in order of 004, 006, and 005. In step 908, the write success/failure information is notified to the file management unit of the server.

The volume write processing in FIG. 9 executed by the disk controller of the backup system may be performed only on a block basis. This embodiment will be described with reference to FIG. 10. In this embodiment, the controller of the backup system server divides the data of the file into blocks. Therefore, the checking processing executed in step 903 in FIG. 9 may be omitted; instead, in step 1001, data transferred between storage system on a block basis is written or data whose block numbers and data specification corresponding to the block numbers are received from the server is written. In step 1002, a check is made if the instruction to write data on the volume is sent from the disk controller of the primary system or from the server of the backup system; the write success/failure information is sent to the disk controller of the primary system (step 1003) in the former case and to the file management unit of the server in the latter case (step 1004).

FIG. 11 is a flowchart showing the steps executed by the file management unit of the backup system. In the file reception processing of the file management unit, the file management unit issues an instruction to the disk controller to write a file, received by the file transfer unit, onto the volume in step 1103. When the disk controller divides the data of the file into blocks, the data is written on the volume by executing steps 903, 906, and 907 in FIG. 9. In step 1104, the write success/failure information is received from the disk controller. This step corresponds to step 908 in FIG. 9. When the data of the file is converted into blocks in the server, the file management unit performs the following in step 1103; that is, it divides the data of the file into blocks, associates the divided data with a block number and a sequence in the file/block management table transferred from the primary system, and issues a write instruction to the disk controller with the block number and the data corresponding to the block number specified. This processing is repeated the number of times equal to the number of data blocks of the file. The file management unit receives the write success/failure information on the data from the disk controller (step 1104). This step corresponds to step 1004 in FIG. 10. In step 1105, the file management unit notifies the write success/failure information to the file transfer unit.

FIG. 12 is a flowchart showing the steps executed by the file transfer unit of the backup system. In the file reception processing of the file transfer unit, the file transfer unit receives a file and the file/block management table information on the file from the primary server via the LAN and the network interface (Net I/F) in step 1203. In step 1204, the file transfer unit notifies the file management unit that the file has been received. Then, the file write instruction in step 1103 in FIG. 11 is issued to the disk controller. In step 1205, the write success/failure information is notified to the file transfer unit of the primary system via the network interface (Net I/F) and LAN. Step 805 in FIG. 8 corresponds to this step.

When data stored in a storage system is backed up but the data cannot be transferred because of a failure that occurs during the data transfer via a SAN, an existing network (LAN, etc.), which is separate from the SAN, and the servers can be used to transfer the data in the embodiment of the present invention. A problem that arises when the data transfer via a SAN is replaced by the data transfer via an existing network (LAN, etc.) because of a difference in the unit of data transferred between the networks is solved by the file management unit of the server that manages the relation between the file and the blocks using the file/block management table.

The present invention realizes flexible data transfer using multiple network protocols with consideration for the data transfer unit.

It should be further understood by those skilled in the art that although the foregoing description has been made on embodiments of the invention, the invention is not limited thereto and various changes and modifications may be made without departing from the spirit of the invention and the scope of the appended claims.

This application relates to and claims priority from Japanese Patent Application No. 2003-426168 filed on Dec. 24, 2003, the entire disclosure of which is incorporated herein by reference.

What is claimed is:

1. A computer system for transferring data from a first storage unit in a storage system to a second storage unit in a backup storage system via a network, said computer system comprising:
a first controller provided in the storage system, which transfers data stored in said first storage unit, to said second storage unit using a block transfer protocol;
a storage area network (SAN) through which the transfer of data using the block transfer protocol is performed to said second storage unit;
a table provided at a sewer coupled to the network, wherein the table associates a file composed of a plurality of blocks of data with blocks of data constituting the file; and
a second controller provided at the server, wherein in response to information that identifies a particular data block to be transferred from said first controller via said SAN, identifies a file corresponding to the particular data block using said table and transfers the identified file to said second storage unit via, a local area network (LAN) using a file transfer protocol,
wherein said SAN is configured to couple said first controller and said second controller and establish a path for data block transfer between said first storage unit and said second storage unit using the block transfer protocol between said first storage unit and said second storage unit and another path for file transfer between said first storage unit and said second storage unit using the file transfer protocol through the server and the LAN,
wherein said table is provided in said second controller of the server and receives, from said first controller of the storage system, information indicating whether the particular data block has been transferred to said second storage unit of the backup storage system successfully in units of data blocks to allow said second controller to select the another path when the information indicates an unsuccessihi transfer of the particular data block.

2. The computer system according to claim 1 wherein, upon detecting a transfer failure when transferring data, which is stored in said first storage unit, using the block transfer protocol, said first controller notifies infoimation to said second controller, said infonnation identifying a particular block concerned wil lithe transfer failure.

3. The computer system according to claim 2 wherein the identified file includes data of blocks other than the block related to the transfer failure.

4. The computer system according to claim 3 wherein the data of blocks other than the block related to the transfer failure is lata that has been transferred by said first controller via the SAN using the block transfer protocol.

5. A computer system that transfers data from a first storage unit in a storage system. to a second storage unit in a backup storage system via a SAN and a LAN, said computer system comprising:
a first controller provided in the storage system that transfers data stored in said first storage unit, to said second storage unit on a block basis via the SAN; and
a second controller provided at a server that transfers data, stored in said first storage unit, to said second storage unit on a file basis via the LAN,
wherein said second controller manages an association between a file composed of a plurality of first blocks of data and the blocks of data constituting the file based on a management table provided at the server defining the association and, upon receiving information identifying a particular data block of the plurality of first blocks to be transferred along a first path from said first storage unit to said second storage unit via the SAN, determines a file including the particular data block using the management table to be transferred along a second path from said first storage unit to said second storage unit via the server and the LAN on a file basis, the flic being passed from said first storage unit to said second storage unit via the SAN,
wherein said management table in said second controller of the server receives, from said first controller of the storage system, information indicating whether the particular data block has been transferred to said second storage unit of the backup storage system successfully in units of data blocks to allow said second controller to select the second path when the information indicates an unsuccessfUl transfer of the pat cular data block, wherein the SAN is confinured to couple said first controller and said second controller and establish a path for data block transfer between said first storage unit and said second storage unit usin a block transfer protocol between said first storage unit and said second storage unit using a file transfer protocol through the server and the LAN.

6. The computer system according to claim 5 wherein, when the transfer on a file basis fails, said second controller identifies a plurality of second blocks related to the transfer-failed file and instructs said first controller to transfer data of the plurality of second blocks.

7. The computer system according to claim 6 wherein said first storage Llmt comprises a main volume and a sub volume that store the same contents of data and wherein, when a transfer of data stored on said sub volume on a block basis fails, said first controller notifies information identifying a particular block of transfer-failed data to said second controller and, in response to an instruction to transfer data of a plurality of third blocks related to the transfer-failed file from said second controller, transfers data corresponding to the plurality of third blocks stored on said main volume on a block basis.

8. A data transfer method for transferring data from a first storage unit in a storage system to a second storage unit in a backup storage system via a network using a second controller, said second controller provided at a server and connected via a SAN to the backup storage system and a first controller that manages data stored in said storage system on a block basis using a block address, said second controller associating infonnation identifying the block addresses with a file identifier for managing a file composed of a plurality of blocks on a file basis, the data transfer method comprising:

at said second controller,
in response to receiving from said first controller information identifying the block address of data to be transferred from said first storage unit to said second storage unit along a first path via the SAN, identifying a file identifier associated with the Ic formation identifying the block address;
providing information identifying a plurality of block addresses associated with the file identifier to said first controller;
in response to receiving information corresponding to the information identifying the plurality of block addresses from said first controller via the SAN, transferring the data from said first storage unit to said second storage unit along the first path on a file basis via a LAN with the file identifier attached to the data; and
receiving from said first controller information indicating whether the data has been transferred to said second storage unit of the backup computer system unit successfully in units of data blocks to allow the second controller to select a second path by which to transfer the data on a file basis from said first storage unit to said second storage unit when the infonnation indicates an unsuccessful transfer of the data,
wherein the SAN is configured to couple said first controller and said second controller and establish a path for data block transfer between said first storage unit and said second storage unit using a block transfcr protocol between said first storage unit and said second storage unit and another path for file transfer between said first storage unit and said second storage unit using a file transfer protocol through the server and the LAN.

9. The data transfer method according to claim 8 wherein said second controller transfers a management table, which associates the information identifying block addresses with a file identifier, to said other computer system when data is transferred on a file basis.

10. The data transfer method according to claim 8 wherein the information identifying a block address is a logical block address.

11. The data transfer method according to claim 8 wherein, upon detecting a failure during transfer of data to a storage system connected to said other computer system. on a block basis, said first controller notifies the information identifying a block address to said second controller via the SAN.

12. The data transfer method according to claim 8 wherein said computer system notifies information identifying a block address to said first controller to request to transfer data on a block basis.

13. A computer-readable medium storing a program that causes a file server to transfer data from a first storage unit in a storage system to a second storage unit in a backup storage system via a SAN, said file server comprising a second controller connected via a fibre channel to the storage system, said storage system comprising a first controller that manages data stored in said first storage unit on a block basis using a block address, said file server associating information identifying the block addresses with a file identifier for managing a file composed of a plurality of blocks on a file basis, the program, when executed, performing the following actions:

upon receiving from said first controller information identifying the block address of data to he transferred from said first storage unit to said second storage unit along a first path via a LAN, causing said file server to identify a file identifier associated with the infonnation identifying the block address and provide information identifying a plurality of block addresses associated with the file identifier to said first controller;
upon receiving information corresponding to the information identifying the plurality of block addresses from said first controller, causing said file server to transfer the data from said first storage unit to said second storage unit along the first path on a file basis with the file identifier attached to th.e data; and
receiving from said first controller information indicating whether the data has been transferred to said second storage unit successfully in units of data blocks to allow said second controller to select a second path by which to transfer the data on a data block basis from said first storage unit to said second storage unit when the information indicates an unsuccessful transfer of the data,
wherein the SAN is configured to couple said first controller and said second controller and establish a path for data block transfer between said first storage unit and said second storage unit using a block transfer protocol between said first storage unit and said second storage unit and another path for file transfer between said first storage unit and said second storage unit using a file transfer protocol through said file server and the LAN.

* * * * *